(12) United States Patent  (10) Patent No.: US 10,414,304 B2
Akimoto et al.  (45) Date of Patent: Sep. 17, 2019

(54) SEAT

(71) Applicant: TACHI-S CO., LTD., Tokyo (JP)

(72) Inventors: Norito Akimoto, Tokyo (JP); Tsutomu Hada, Tokyo (JP); Hiroyuki Nojima, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/549,319

(22) PCT Filed: Jan. 13, 2016

(86) PCT No.: PCT/JP2016/050750
§ 371 (c)(1),
(2) Date: Aug. 7, 2017

(87) PCT Pub. No.: WO2016/129315
PCT Pub. Date: Aug. 18, 2016

(65) Prior Publication Data
US 2018/0022253 A1 Jan. 25, 2018

(30) Foreign Application Priority Data

Feb. 9, 2015 (JP) .................. 2015-023157

(51) Int. Cl.
*B60N 2/58* (2006.01)
*B68G 7/052* (2006.01)

(52) U.S. Cl.
CPC ......... *B60N 2/5825* (2013.01); *B60N 2/5875* (2013.01); *B60N 2/5883* (2013.01); *B60N 2/5891* (2013.01); *B68G 7/052* (2013.01)

(58) Field of Classification Search
CPC .. B60N 2/5825; B60N 2/5875; B60N 2/5883; B60N 2/5891; B68G 7/052
USPC ............ 297/452.46, 452.47, 452.22, 452.26, 297/188.2, 452.38
See application file for complete search history.

(56) References Cited

U.S. PATENT DOCUMENTS 3,401,217 A * 9/1968 Burwell ................... A47C 7/18
264/257
3,924,893 A * 12/1975 Ferrara ................ B60N 2/5621
297/452.34
5,899,534 A * 5/1999 Gray .................... B60N 2/3084
297/238

(Continued)

FOREIGN PATENT DOCUMENTS

FR            3021005 A1 * 11/2015 ............... B60N 2/58
JP          S59-62081 A    4/1984
(Continued)

OTHER PUBLICATIONS

International Search Report for PCT/JP2016/050750 dated Apr. 19, 2016; English translation submitted herewith (4 pages).

*Primary Examiner* — Syed A Islam
(74) *Attorney, Agent, or Firm* — Fitch, Even, Tabin & Flannery, LLP

(57) ABSTRACT

A vehicular seat provided in a seat surface with a deep and narrow depression having a flat surface at the bottom is provided. The vehicular seat is a seat for automobiles including: a seat cushion to be a seating face portion of the seat; and a seat back provided on the back of the seat cushion and to be a backrest portion of the seat. A recess having a flat surface at the bottom is provided in the surface of at least one of the seat cushion and the seat back.

12 Claims, 7 Drawing Sheets

(56) References Cited

U.S. PATENT DOCUMENTS

| | | | |
|---|---|---|---|
| 2009/0146483 A1* | 6/2009 | Niwa | B60N 2/58 297/452.61 |
| 2017/0151897 A1* | 6/2017 | Nishikido | B60N 2/58 |
| 2018/0056836 A1* | 3/2018 | Schacht | B60N 2/72 |

FOREIGN PATENT DOCUMENTS

| | | |
|---|---|---|
| JP | H09-239166 A | 9/1997 |
| JP | 2004-000337 A | 1/2004 |
| JP | 2004-008488 A | 1/2004 |
| JP | 2009-148407 A | 7/2009 |
| JP | 2011-078452 A | 4/2011 |
| JP | 2012-020668 A | 2/2012 |
| JP | 2014-133018 A | 7/2014 |

* cited by examiner

23

24

SEAT

CROSS-REFERENCE TO RELATED APPLICATIONS

This application is a U.S. national phase application filed under 35 U.S.C. § 371 of International Application No. PCT/JP2016/050750, filed Jan. 13, 2016, designating the United States, which claims priority from Japanese Patent Application No. 2015-023157, filed Feb. 9, 2015, which are hereby incorporated herein by reference in their entirety.

TECHNICAL FIELD

The present invention relates to a vehicular seat and a method for manufacturing the same.

BACKGROUND ART

Various functions, including safety, holdability, and ease of egress and ingress (ease of getting in and out) are required for vehicular seats, such as automobile seats. In addition, there are also many demands for the enhancement of passengers' comfortability, such as seat comfort and vibration absorption. Vehicular seats are one of large parts among the interior parts of automobiles and there are various demands also with respect to the appearance and design thereof.

To meet diversified needs in automobile seat design, a wide variety of uneven shapes, curved surfaces, or curved lines must be formed on seat surfaces. It is a critical challenge to develop a seat structure and a manufacturing method for implementing such a structure.

An example of the background arts in this technical field is the technology described in Patent Literature 1. Patent Literature 1 discloses a cushion body of a seat for automobiles. The cushion body is formed of a plurality of unit cushions obtained by covering a pad material with a trim and a supporting body supporting each unit cushion. A predetermined number of locking members provided in either or both of the pad material and the trim are locked on the supporting body and each unit cushion is thereby attached to the supporting body.

The patent literature states that according to the above-mentioned cushion body of a seat for automobiles, it is possible to contribute to reduction of a work load and variation in product quality and to enhance the degree of freedom in designing.

Patent Literature 2 discloses a drawing structure for seat skins. The drawing structure is provided on the inner face side of a seat skin with a drawing cord having a hook positioned at an opening in a cushion pad and hooked and secured on the axis line of an insert wire exposed from the opening. A predetermined drawing line is provided in the surface of the seat skin by the drawing cord including the hook and the seat skin is assembled to the cushion pad with the shapes thereof matched with each other.

The patent publication states that according to the above-mentioned drawing structure for seat skins, it is possible to draw in the surface of a seat skin without fail, assemble the seat skin to a cushion pad with the shapes thereof accurately matched with each other, and prevent twitched wrinkles, a dimple-like depression, or the like from being formed on the decorative surface side of the seat skin.

Patent Literature 3 discloses a trim drawing structure for seats. The trim drawing structure includes a resin hook provided with: a base portion made of a soft material attached to a pair of trims covering the surface of a seat pad; and a hook portion provided at the tip of the base portion and locked on a locked member provided on the seat pad side. The paired trims are drawn in and locked on the locked member by the resin hook and are thereby secured on the seat pad.

The patent publication states that according to the above-mentioned trim drawing structure for seats, it is possible to easily attach and remove the resin hook to and from the trims and dismantle the seat and to firmly secure the trim to the seat pad without fail.

Patent Literature 4 discloses a drawing structure for skin materials configured to lock a part of a skin material covering a vehicular seat on the pad member side such that the part is drawn in to form a design slit in the vehicular seat. A rail member having openings is laid on the pad member in a position corresponding to the position of formation of the design slit and a flexible plate body that can be bent and deformed in the direction of thickness is attached to the back of the skin material opposite to the rail member. A plurality of engaging protrusions that can be engaged with the above-mentioned openings are formed at intervals on the entire surface of the plate body opposed to the rail member. The engaging protrusions are engaged with the openings in the rail member such that the engaging protrusions can be relatively moved along the rail member.

The patent publication states that according to the above-mentioned drawing structure for skin materials, it is possible to stably lock the skin material in correspondence with the outside shape of the pad member such that the skin material is drawn in.

Patent Literature 5 discloses a vehicular seat that is provided with a value adding member enhancing designability, functionality, and the like and in which a drawing wire for drawing in a skin covering the outer surface is buried in a pad as a cushion material. A recess for fitting the above-mentioned value adding member is formed in the pad and the value adding member is provided on the back thereof with a hook. The drawing wire is buried toward the inner part of the recess along the recess and the skin covers the entire outer surface of the pad including the recess. The value adding member is fit into the recess from outside the skin and the skin is locked on the drawing wire through the hook.

The patent publication states that according to the above-mentioned vehicular seat, it is possible to draw in the skin and fit the value adding member with efficiency and ease through a simple configuration and to enhance the designability of the seat.

CITATION LIST

Patent Literature

PTL 1: Japanese Patent Application Laid-Open No. Hei 9(1997)-239166

PTL 2: Japanese Patent Application Laid-Open No. 2004-337

PTL 3: Japanese Patent Application Laid-Open No. 2004-8488

PTL 4: Japanese Patent Application Laid-Open No. 2009-148407

PTL 5: Japanese Patent Application Laid-Open No. 2012-20668

SUMMARY OF INVENTION

Technical Problem

As mentioned above, with respect to vehicular seats, such as automobile seats, a wide variety of uneven shapes, curved surfaces, and curved lines must be formed in seat surfaces to cope with diversified automobile seat designs.

Especially, with respect to high-grade car models, there are demands for providing a seat surface with such a deep and narrow depression as having a flat surface at the bottom to give the seat an upscale image. It is difficult to form such a three-dimensional depression (recess) in a seat surface with enhanced appearance.

The technologies described in Patent Literature 1 to Patent Literature 5 all relate to decorating the surface of an automobile seat. However, neither of these patent publications describes a technology to form such a deep and narrow depression (recess) as having a flat surface at the bottom in a seat surface as mentioned above.

Consequently, it is an object of the present invention to provide a vehicular seat provided in a seat surface with a deep and narrow depression having a flat surface at the bottom.

It is another object of the present invention to provide a method for manufacturing a vehicular seat in which a deep and narrow depression having a flat surface at the bottom is formed in a seat surface with favorable reproducibility.

Solution to Problem

To solve the above problems, the present invention provides a vehicular seat including a seat cushion to be a seating face portion of the seat and a seat back provided on the rear side of the seat cushion and to be a backrest portion of the seat. The vehicular seat is characterized in that a recess having a flat surface at the bottom is provided in the surface of at least one of the seat cushion and the seat back.

The present invention provides a method for manufacturing a vehicular seat including the steps of: (a) providing a plurality of drawing members on the back face side of the skin material of at least one of a seat cushion and a seat back; and (b) securing the drawing members on a plurality of supporting members provided inside the seat cushion or the seat back and forming a recess having a flat surface at the bottom on the front face side of the skin material.

Advantageous Effects of Invention

According to the present invention, it is possible to implement a vehicular seat provided in a seat surface with a deep and narrow depression having a flat surface at the bottom.

In addition, according to the present invention, it is possible to implement a method for manufacturing a vehicular seat so that a deep and narrow depression having a flat surface at the bottom can be formed in a seat surface with favorable reproducibility.

Other problems, configuration elements, and effects than mentioned above will be apparent from the following description of embodiments.

DESCRIPTION OF EMBODIMENTS

Figure 1:
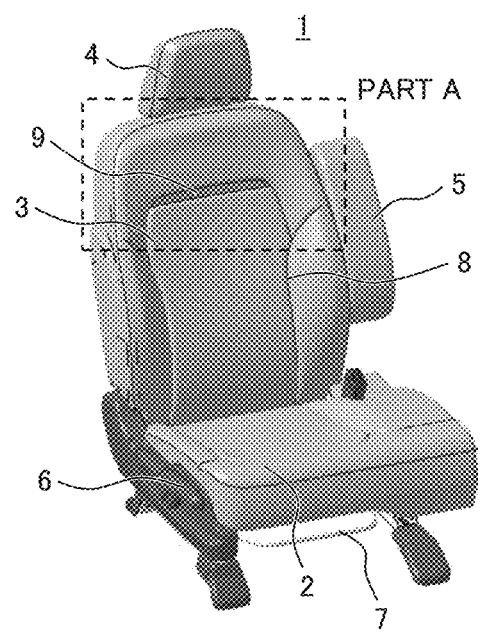
FIG. 1 is a drawing illustrating an overview of a vehicular seat in an embodiment of the present invention.

Hereafter, a description will be given to embodiments of the present invention with reference to the drawings. In the following drawings, identical configuration elements will be marked with identical reference numerals and a redundant detailed description of an identical configuration element will be omitted.

First Embodiment

Figure 9:
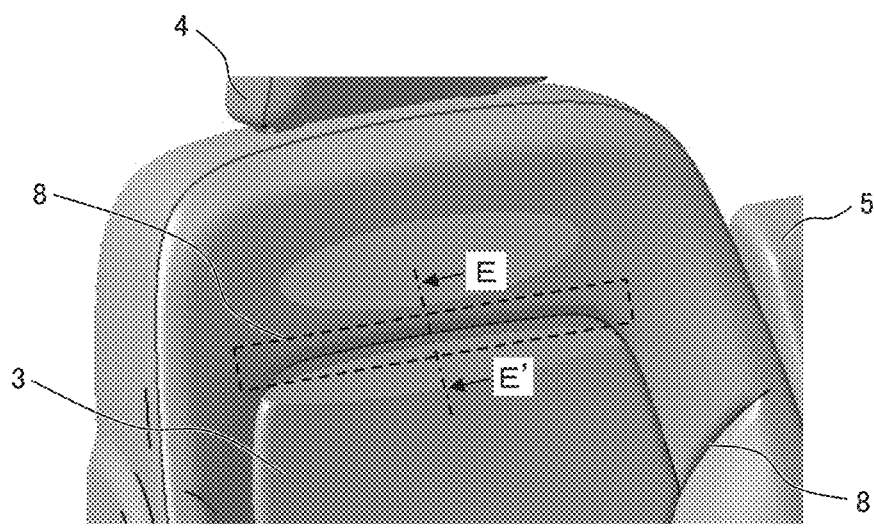
FIG. 9 is a partial enlarged view of a conventional vehicular seat.
Figure 10:
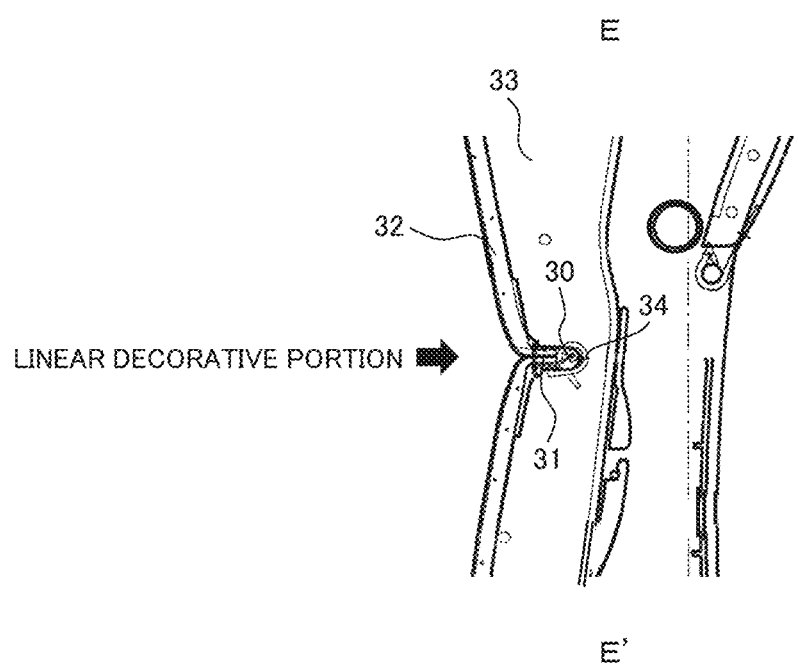
FIG. 10 is a partial sectional view of a conventional vehicular seat.

First, a description will be given to ornament (decoration) provided in a seat surface of a conventional vehicular seat, such as an automobile seat, with reference to FIG. 9 and FIG. 10. FIG. 9 is an enlarged view of the upper part of a seat back 3 as the backrest portion of a vehicular seat. FIG. 10 is a sectional view taken along line E-E' of FIG. 9.

When a conventional vehicular seat is decorated with a depression, a linear decorative portion 8 based on a linear depression is formed as shown in FIG. 9. This linear decorative portion 8 is provided in not only the seat back 3 but also other portions of the seat, including a seat cushion (not shown) as the seating face portion of the seat, as required.

The linear decorative portion 8 provided in a seat back or a seat cushion is formed by: drawing (pulling) a skin material 32 of the seat inward of the seat by a drawing member 31 as shown in FIG. 10; and securing the drawing member 31 on a supporting member 30 provided inside the seat, for example, inside a urethane pad 33. As the supporting member 30, a metal wire or the like is used. To secure the drawing member 31 on the supporting member 30 such as a wire, such a securing member as a C type retaining ring 34 is used.

As mentioned above, a decorative portion of conventional vehicular seats is formed by drawing a skin material of the seat into the seat using a drawing member and securing the skin material on one wire, that is, a supporting member provided inside the seat. Therefore, as shown in FIG. 9, only a linear depression can be formed.

Figure 2:
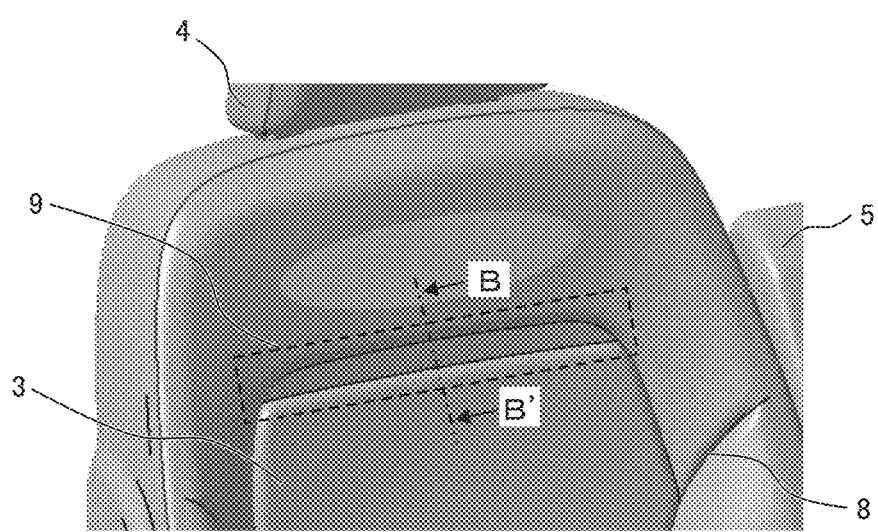
FIG. 2 is a partial enlarged view of a vehicular seat in an embodiment of the present invention.
Figure 3:
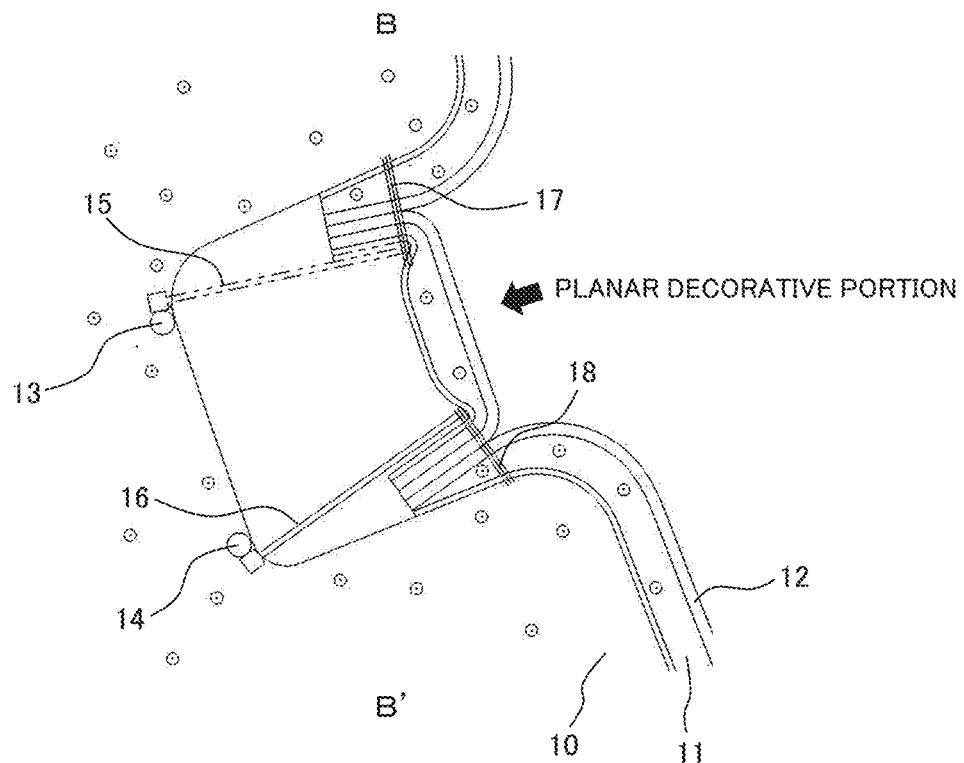
FIG. 3 is a partial sectional view of a vehicular seat in an embodiment of the present invention.

A description will be given to ornament (decoration) provided in a seat surface of a vehicular seat in this embodiment with reference to FIG. 1 to FIG. 3. FIG. 1 illustrates an overview of a vehicular seat in this embodiment. FIG. 2 is an enlarged view of part A in FIG. 1. FIG. 3 is a sectional view taken along line B-B' of FIG. 2.

As illustrated in FIG. 1, the vehicular seat 1 in this embodiment includes as major parts thereof: a seat cushion 2 to be the seating face portion of the seat; a seat back 3 provided on the back of the seat cushion 2 and to be the backrest portion of the seat; a headrest 4 protecting the head and neck of an occupant; an armrest 5 on which an occupant places his/her elbow; and the like. On both sides of the seat cushion 2, a side support (not shown) supporting a side portion of the seating face portion is provided as required.

The vehicular seat 1 is also provided with adjusting mechanisms, such as a reclining lever 6 for adjusting the angle of the seat back 3 and a slide lever 7 for adjusting the fore-and-aft position of the seat relative to the relevant vehicle.

The seat back 3 of the vehicular seat 1 is three-dimensionally provided in the surface thereof with a linear decorative portion 8 and a planar decorative portion 9. The linear decorative portion 8 and the planar decorative portion 9 are reproduced in the seat surface according to a seat designer's design.

The linear decorative portion 8 is formed as a linear depression by a conventional technique, that is, drawing in a skin material to one wire provided inside the seat.

Meanwhile, the planar decorative portion 9 is formed so as to have a flat surface at the bottom of a depression (recess) as shown in FIG. 2.

The planar decorative portion 9 is formed as a planar decoration as shown in FIG. 3 by: drawing (pulling) a skin material 12 of the seat inward of the seat by drawing members 15, 16; and respectively securing the drawing members 15, 16 on two supporting members 13, 14 provided inside the seat, for example, inside a urethane pad 10.

As the supporting members 13, 14, a metal wire or the like is used. As the drawing members 15, 16, a member of metal, resin, or the like is used.

One end of each of the drawing members 15, 16 is secured on the skin material 12 with such a fastening member 17, 18 as a sewing thread. As shown in FIG. 3, wadding 11 as a filling material may be placed between the urethane pad 10 and the skin material 12 as required.

The other end of each of the drawing members 15, 16 is secured on one of the supporting members 13, 14 with a C type retaining ring or the like (not shown).

As mentioned above, in the vehicular seat in this embodiment, a depression (recess) having a flat surface at the bottom is formed in the seat surface by drawing in the skin material 12 to the two wires 13, 14 provided inside the seat substantially in parallel to each other.

The number of wires provided inside the seat is not limited to two. An example will be taken. When it is desired to form a wider flat surface at the bottom of the recess in the planar decorative portion 9, a wider planar decoration can be formed. This is done by widening the distance between the supporting members 13 and 14, additionally providing another supporting member (wire) between the supporting members 13, 14, and drawing in the skin material by a drawing member provided separately from the drawing members 15, 16.

Figure 4:
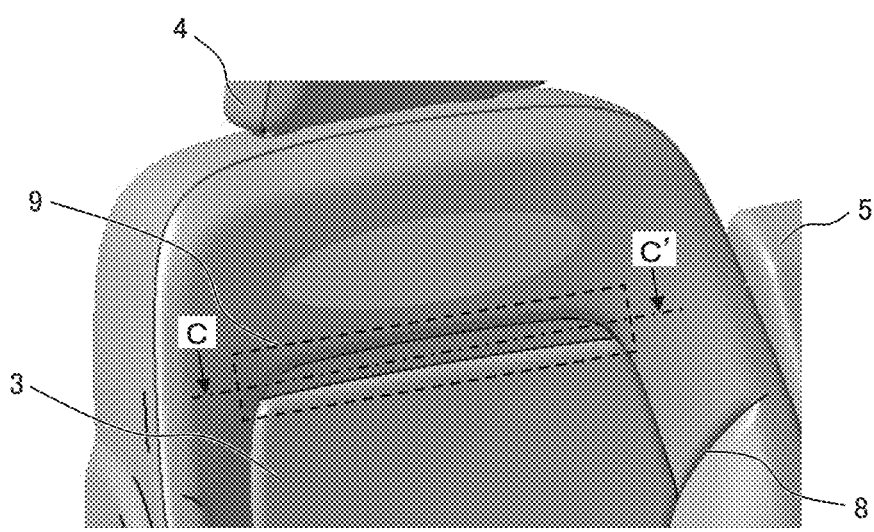
FIG. 4 is a partial enlarged view of a vehicular seat in an embodiment of the present invention.
Figure 5A:
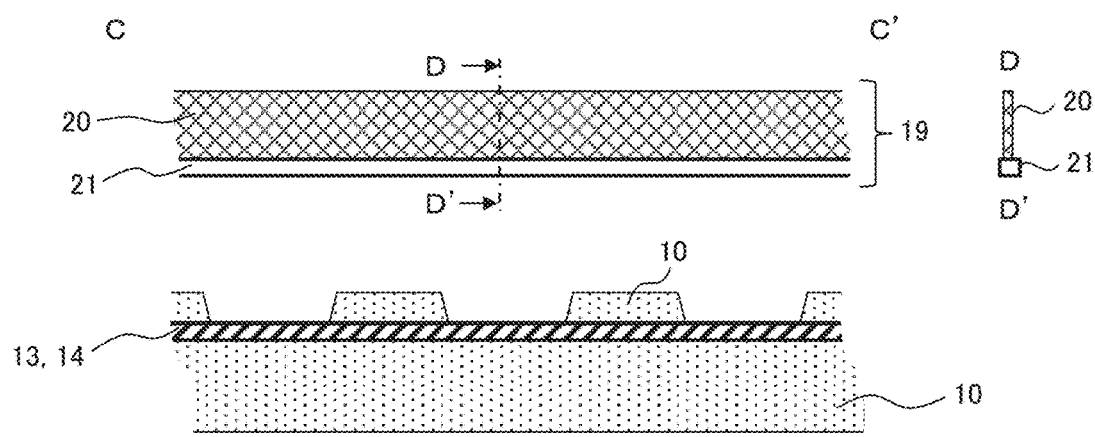
FIG. 5A is a partial sectional view of a vehicular seat in an embodiment of the present invention.
Figure 5B:
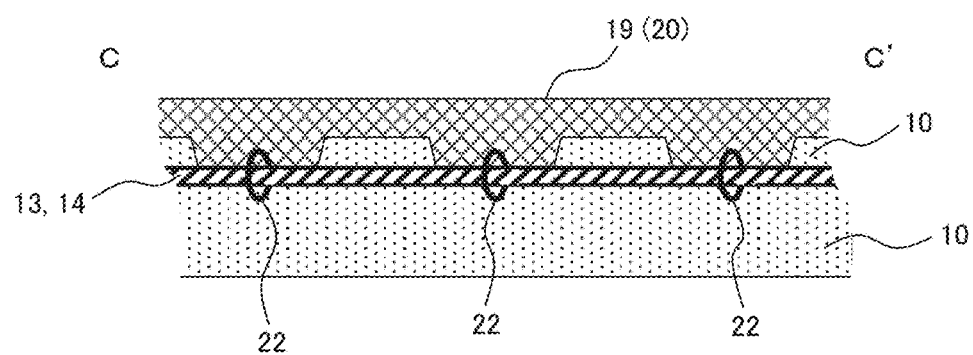
FIG. 5B is a partial sectional view of a vehicular seat in an embodiment of the present invention.

A description will be given to a part of a method for manufacturing a vehicular seat in this embodiment with reference to FIG. 4 to FIG. 7. FIG. 5A and FIG. 5B are sectional views taken along line C-C' of FIG. 4. FIG. 5A shows a section taken along line C-C' before the formation of a planar decorative portion 9 and FIG. 5B shows a section taken along line C-C' after the planar decorative portion 9 is formed in the seat surface.

As shown in FIG. 5A, a mesh suspender 19 and wires 13, 14 provided inside the seat are separated from each other before the formation of the planar decorative portion 9. The mesh suspender 19 is composed of a mesh portion 20 and a front-end portion 21.

First, the end portion of the mesh portion 20 of the mesh suspender 19 on the side opposite the front-end portion 21 is secured on the skin material of the seat. To secure the mesh portion 20 on the skin material, as shown in FIG. 3, such a fastening member as a sewing thread is used. An adhesive or the like may be used instead of a sewing thread.

Subsequently, as shown in FIG. 5B, the front-end portion 21 of the mesh suspender 19 is brought into tight contact with the wire 13 or 14 and secured with a C type retaining ring 22 such that the front-end portion 21 and the wires 13, 14 are bundled together. One end of the mesh suspender 19, that is, the end on the side opposite the front-end portion 21 is secured on the skin material of the seat. At this time, therefore, the mesh suspender 19 and the portions of the skin material on which the mesh suspender is secured are drawn (pulled) inward of the seat.

The above-mentioned work is conducted on each of the wires 13, 14 provided inside the seat substantially in parallel to each other. As a result, such a depression (recess) having a flat surface at the bottom as shown in FIG. 4 can be formed.

The front-end portion 21 of the mesh suspender 19 is secured to the wires 13, 14 such that the front-end portion 21 and the wires 13, 14 are bundled together. This is done by attaching the C type retaining ring 24 shown in FIG. 6B to the tip of, for example, the hook ringer 23 shown in FIG. 6A and swaging the C type retaining ring 24 with the hook ringer 23.

The hook ringer 23 is a swaging jig for C type retaining rings used to fix (bundle) two or more members with a C type retaining ring.

Figure 6A:
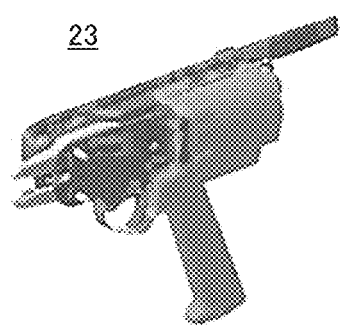
FIG. 6A is a drawing illustrating a jig used to manufacture a vehicular seat in an embodiment of the present invention.
Figure 6B:
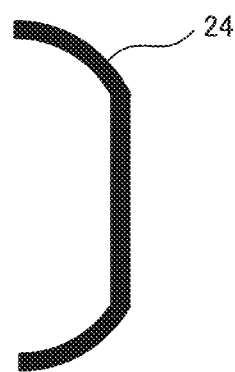
FIG. 6B is a drawing illustrating a member used in a vehicular seat in an embodiment of the present invention.
Figure 6C:
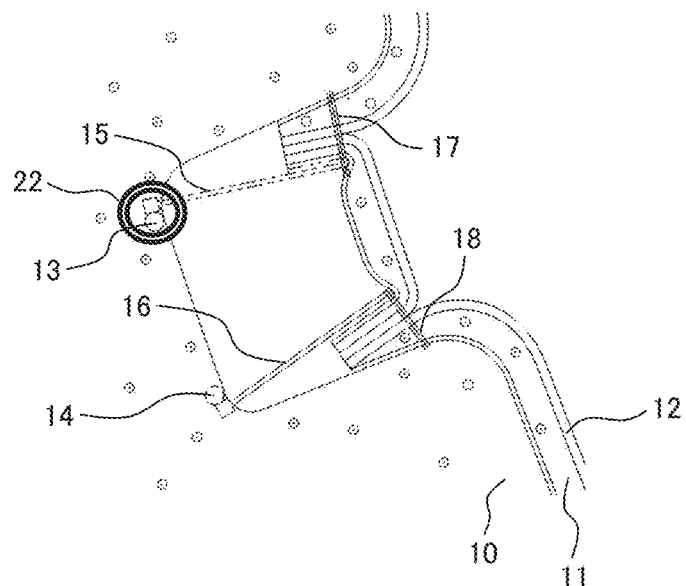
FIG. 6C is a partial sectional view of a vehicular seat in an embodiment of the present invention.
Figure 6D:
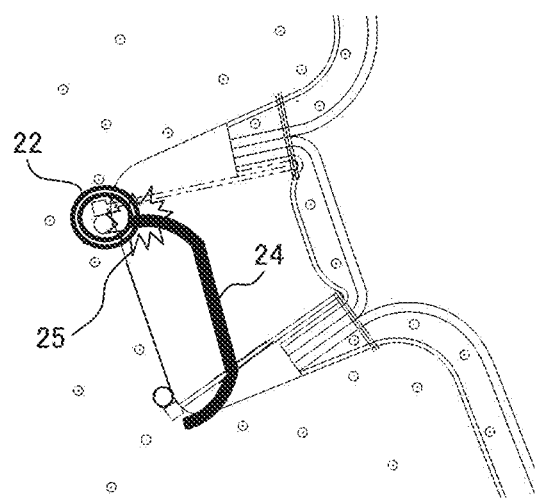
FIG. 6D is a drawing illustrating a problem involved in a manufacturing process for a vehicular seat in an embodiment of the present invention.

When the front-end portion 21 of the mesh suspender 19 and the wires 13, 14 are fixed together with the C type retaining rings 24 using the hook ringer 23, such a problem as shown in FIG. 6C and FIG. 6D arises.

When the front-end portion of the drawing member 15, that is, the mesh suspender is first secured on the upper wire 13 with a C type retaining ring as shown in FIG. 6C, the problem arises. When an attempt is subsequently made to secure the front-end portion of the mesh suspender on the lower wire 14 with a C type retaining ring, the unfastened C type retaining ring 24 can be brought into contact with the C type retaining ring 22 fastened first.

In this case, the unfastened C type retaining ring 24 must be slightly displaced and this degrades workability. When the position of anchorage of the drawing member is slightly displaced between the two wires, the upper and lower wires 13, 14, the shape of the recess in the planar decorative portion 9 can be deformed.

Figure 7:
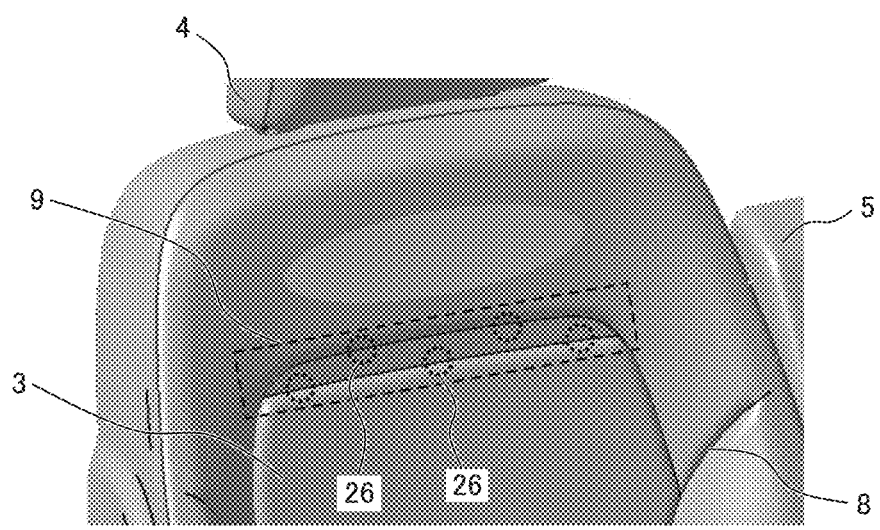
FIG. 7 is a partial enlarged view of a vehicular seat in an embodiment of the present invention.

To cope with this, in the vehicular seat in this embodiment, the measure shown in FIG. 7 is taken. That is, the areas where the front-end portion of the drawing member, that is, the mesh suspender and the two wires are fixed together, that is, the areas where the C type retaining rings are fastened are displaced at certain intervals between the upper and lower wires. Work efficiency can be thereby enhanced. In addition, the shape of the recess in the planar decorative portion 9 can be formed with enhanced appearance. FIG. 7 illustrates an example in which the upper and lower C type retaining ring fastening areas 26 are arranged in a staggered configuration.

As described up to this point, according to a vehicular seat in this embodiment, a decoration involving a depression (recess) having a flat surface at the bottom can be formed in a seat surface of the vehicular seat with ease and favorable reproducibility.

By displacing areas where a drawing member for a seat skin is secured to wires located inside the seat, operational errors can be reduced and work efficiency can be enhanced.

The depth of a depression (recess) formed in a seat surface can also be adjusted by varying the length of a drawing member itself or adjusting the positions where a drawing member and a skin material and supporting members (wires) are fixed together.

Second Embodiment

Figure 8:
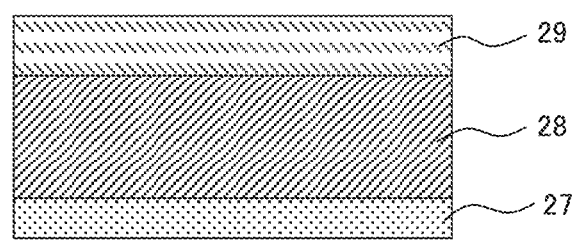
FIG. 8 is a partial sectional view of a vehicular seat in an embodiment of the present invention.

A description will be given to a vehicular seat in the second embodiment with reference to FIG. 8. FIG. 8 illustrates a section of a seat skin material in an area where a planar decorative portion 9 is formed.

In the vehicular seat in the second embodiment, the skin material of a three-layered structure shown in FIG. 8 is used at least for the skin material of a seat in which a planar decorative portion 9 is formed. The three layers in FIG. 8 are a lower layer 27, an intermediate layer 28, and an upper layer 29 from bottom in this order. This three-layered structure uses a skin material composed of a combination of, for example, a cloth-based jersey material, a urethane material, and a cloth-based tricot material.

Adoption of such a skin material of a three-layered structure as mentioned above for the skin material in which a planar decorative portion 9 is formed makes it possible to enhance the rigidity of the skin material and the flat appearance of a flat surface formed at the bottom of a depression (recess) when the planar decorative portion 9 is formed.

Enhancing the rigidity of the skin material makes it possible to maintain a depressed shape (recessed shape) formed in the seat skin for a long time and to enhance the durability of a planar decoration formed in the seat.

To form the planar decorative portion with more favorable reproducibility and maintain the recessed shape thereof for a longer time, it is preferable that the above-mentioned three-layered structure is constructed by arranging a cloth-based tricot material, a urethane material, and a cloth-based jersey material from the lower layer in this order.

The present invention is not limited to the above-mentioned embodiments and includes various modifications. The above embodiments have been described in detail for making the present invention easily understandable and need not include all the configuration elements described above. A part of the configuration elements of an embodiment may be replaced with a configuration element of another embodiment; and a configuration element of an embodiment may be added to the configuration elements of another embodiment. A different configuration element may be added to or replaced with a part of the configuration elements of each embodiment and a part of the configuration elements of each embodiment may be deleted.

REFERENCE SINGS LIST

1—Vehicular seat,
2—Seat cushion,
3—Seat back,
4—Headrest,
5—Armrest,
6—Reclining lever,
7—Slide lever,
8—Linear decorative portion,
9—Planar decorative portion,
10, 33—Urethane pad,
11—Wadding (filling material),
12—Skin material (three-layered),
13, 14, 30—Wire (supporting member),
15, 16, 31—Drawing member,
17, 18—Sewing thread (fastening member),
19—Mesh suspender,
20—Mesh portion,
21—Front-end portion,
22, 34—C type retaining ring (securing member),
23—Hook ringer,
24—C type retaining ring member (before swaging),
25—Area of contact between C type retaining rings (area of interference),
26—C type retaining ring fastening area,
27—Lower layer,
28—Intermediate layer,
29—Upper layer,
32—Skin material.

The invention claimed is:

1. A vehicular seat comprising:
a seat cushion to be a seating face portion of the seat;
a seat back provided on the back of the seat cushion and to be a backrest portion of the seat;
a seat skin covering a surface of at least one of the seat cushion and the seat back,
wherein a recess having a flat surface comprising a portion of the seat skin at the bottom of the recess is provided in the surface of at least one of the seat cushion and the seat back;
at least first and second supporting members provided substantially in parallel to each other inside the seat cushion or the seat back; and
at least one first drawing member having one end secured to the seat skin and another end secured to the first supporting member, and at least one second drawing member having one end secured to the seat skin and another end secured to the second supporting member,
wherein the flat surface comprising the portion of the seat skin at the bottom of the recess is formed by drawing in the portion of the seat skin to the at least first and second supporting members with the at least one first drawing member and the at least one second drawing member.

2. The vehicular seat according to claim 1,
wherein when the seat cushion or the seat back is planarly viewed from the passenger seating face side, the areas where the at least one first drawing member and the at least one second drawing member are secured to the at least one first supporting member and the at least one second supporting member are arranged in a staggered configuration.

3. The vehicular seat according to claim 1, wherein the depth of the recess is adjusted by varying the length of the at least one first drawing member and the at least one second drawing member and the positions where the at least one first drawing member and the at least one second drawing member and the seat skin and the at least one first supporting member and the at least one second supporting member are fixed together.

4. The vehicular seat according to claim 1,
wherein the seat skin is of a three-layered structure at least in an area where the recess is formed.

5. The vehicular seat according to claim 4,
wherein the three-layered structure is formed of a combination of a cloth-based jersey material, a urethane material, and a cloth-based tricot material.

6. The vehicular seat according to claim 1,
wherein the at least one first supporting member and the at least one second supporting member are metal wires.

7. The vehicular seat according to claim 1,
wherein the at least one first drawing member and the at least one second drawing member are made of metal or resin.

8. A method for manufacturing a vehicular seat comprising the steps of:
   (a) providing a plurality of drawing members on the underside of a skin material of at least one of a seat cushion and a seat back; and
   (b) securing the drawing members on a plurality of supporting members provided substantially in parallel to each other inside the seat cushion or the seat back to form a recess having a flat surface at the bottom on the front side of the skin material.

9. The method for manufacturing a vehicular seat according to claim 8,
wherein the drawing members are secured on a plurality of the supporting members such that when the seat cushion or the seat back is planarly viewed from the passenger seating face side, the areas where the drawing members and the supporting members are fixed together are arranged in a staggered configuration.

10. The method for manufacturing a vehicular seat according to claim 8,
wherein the depth of the recess is adjusted by varying the length of the drawing members and the positions where the drawing members and the skin material and the supporting members are fixed together.

11. The method for manufacturing a vehicular seat according to claim 8,
wherein the skin material is of a three-layered structure at least in an area where the recess is formed.

12. The method for manufacturing a vehicular seat according to claim 11,
wherein the three-layered structure is formed of a combination of a cloth-based jersey material, a urethane material, and a cloth-based tricot material.

\* \* \* \* \*